(12) United States Patent
Harner et al.

(10) Patent No.: US 6,626,504 B2
(45) Date of Patent: *Sep. 30, 2003

(54) BRAKE ACTUATION SYSTEM FOR TOWED VEHICLES

(75) Inventors: John B. Harner, Waynesboro, VA (US); Marcia S. Albright, Coldwater, MI (US); Dennis M. Morse, Jackson, MI (US); Bruce E. Smith, Leo, IN (US)

(73) Assignee: Tekonsha Engineering Company, Tekonsha, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,876

(22) Filed: Sep. 23, 1999

(65) Prior Publication Data

US 2002/0030405 A1 Mar. 14, 2002

(51) Int. Cl.[7] .............................................. B60T 13/00
(52) U.S. Cl. ............................................................ 303/7
(58) Field of Search .............................. 303/7; 188/3 R, 188/3 H

(56) References Cited

U.S. PATENT DOCUMENTS

| | | | | |
|---|---|---|---|---|
| 2,711,228 A | * | 6/1955 | Shank | 188/3 |
| 3,204,725 A | * | 9/1965 | McGraw | 188/3 |
| 3,318,422 A | * | 5/1967 | Frescura | 188/112 |
| 3,771,838 A | | 11/1973 | Rossigno et al. | |
| 3,790,807 A | | 2/1974 | Rossigno | |
| 3,866,719 A | * | 2/1975 | Streutker | 188/3 R |
| 3,897,979 A | * | 8/1975 | Vangalis et al. | 303/24 BB |
| 3,901,358 A | | 8/1975 | Dixon | |
| 4,049,324 A | * | 9/1977 | Cermak | 303/7 |

(List continued on next page.)

OTHER PUBLICATIONS

"BRAKEbuddy" Advertisement dated Jul. 1997 by Master Concepts Inc.

*Primary Examiner*—Christopher P. Schwartz
*Assistant Examiner*—Benjamin A Pezzlo
(74) *Attorney, Agent, or Firm*—Price, Heneveld, Cooper, DeWitt & Litton

(57) ABSTRACT

An apparatus and system for automated operation of the brakes on a towed vehicle, in particular the conventional hydraulic brakes on an automotive vehicle, by controlled actuation of its own brake pedal or other such conventional operating component which is normally manipulated by the operator of the vehicle. The preferred embodiment of the system utilizes a power-actuated tension member such as a cable which is attachable to the towed vehicle brake pedal to pull it downward and thus apply the vehicle brakes in controlled response to commands from a controller mountable at a remote location such as on the towing vehicle, and the controller preferably includes, and operates in response to, an inertia sensor and related system which monitors deceleration of the towing vehicle caused by application of its brakes etc., as well as a manual control for selective optional braking of the towed vehicle by the tow vehicle driver at any desired time. The apparatus and system further includes a power unit typically mounted on the towed vehicle (e.g., under the hood) has a drive motor that operates through a controllable slip clutch, preferably a magnetically engageable and controllable clutch device, for generating the pulling force applied to the towed vehicle brake pedal by the cable/tension member. Also, the power unit preferably includes a vacuum pump or other power assist unit coupled to the towed vehicle power brake system unit, to enable use of that system when the brake pedal is pulled down by the cable during the remotely controlled braking process.

26 Claims, 2 Drawing Sheets

U.S. PATENT DOCUMENTS

| | | | |
|---|---|---|---|
| 4,054,325 A | * 10/1977 | Popp | 303/7 |
| 4,398,771 A | * 8/1983 | McCurry et al. | 303/15 |
| 5,031,729 A | 7/1991 | Wittkop et al. | |
| 5,411,321 A | 5/1995 | Harness | |
| 5,415,466 A | * 5/1995 | Breen et al. | 188/181 T |
| 5,431,253 A | 7/1995 | Hargrove | |
| 5,465,813 A | * 11/1995 | Lichter | 188/3 H |
| 5,503,468 A | * 4/1996 | Saffran | 303/7 |
| 5,626,402 A | 5/1997 | Saffran | |
| 5,709,435 A | * 1/1998 | Wood | 303/7 |
| 5,800,025 A | * 9/1998 | McGrath et al. | 303/7 |
| 5,823,637 A | 10/1998 | Blue | |
| 5,911,483 A | 6/1999 | Overhulser | |
| 5,915,798 A | * 6/1999 | Ford | 303/7 |
| 5,954,164 A | * 9/1999 | Latham | 188/112 R |
| 6,012,780 A | * 1/2000 | Duvernay | 303/7 |
| 6,033,034 A | 3/2000 | Elkins | |
| 6,152,544 A | * 11/2000 | Greaves, Jr. | 303/7 |
| 6,158,823 A | * 12/2000 | Schuck | 303/7 |

\* cited by examiner

BRAKE ACTUATION SYSTEM FOR TOWED VEHICLES

FIELD OF INVENTION

This invention relates to an actuation and control system for applying the brakes on a towed vehicle by commands from and/or in response to the operation of the towing vehicle, in particular, in response to actuation of the brakes on the towing vehicle. In a more particular sense, the invention relates to an apparatus for remotely applying and controlling the brakes on a towed automobile or the like, such as typically is equipped with a hydraulic brake system that operates in response to brake pedal movement by the driver, for which remote actuation and control is a highly desirable feature when the automobile is being towed by another vehicle, for example, a motorhome or other recreational vehicle.

BACKGROUND OF THE INVENTION

As is often observed in highway travel, recreational vehicle users such as motorhome operators frequently tow an automobile behind the recreational vehicle in order to have more convenient transportation when the recreational vehicle is parked at some camping site or park. This is particularly desirable when the recreational vehicle is large and inconvenient for short trips such as shopping or sightseeing, or when it is parked and connected to various utilities whose disconnection is inconvenient, as is usually the case.

When automobiles are so towed on the highway, operation of their brakes from or in correspondence to those of the towing vehicle is usually not attempted since an effective means for doing so has historically not been available, or not convenient to install or use. At the same time, most automobiles possess considerable size and mass, and thus impose an undue additional burden on the braking system of the towing vehicle, for which the latter is in most instances not initially designed. Thus, the desirability of utilizing the existing onboard braking system of a towed automobile has been generally recognized for some time, but since automotive braking systems are closed hydraulic systems and it is undesirable as well as potentially hazardous to open them and connect extraneous devices in flow communication with them, and since most modern automobiles employ power brakes of one type or another which only operate effectively while the vehicle engine is running, the problem is a difficult one which has not as yet been satisfactorily solved.

In an effort to solve the problem identified above, a number of different products have been put on the market or proposed for actuating the brake pedal on the towed vehicle in response to some command from the towing vehicle, such as by using a manual control switch or deriving a signal from the brake light excitation voltage present when the towing vehicle brakes are applied, together with some electrical, mechanical, hydraulic, or pneumatic means for moving the brake pedal on the towed vehicle by pushing or pulling it. In most such cases, the towed vehicle brakes are not applied in a manner proportional to the operation of the towing vehicle brakes, and this creates a disparity in braking force between the two vehicles. Some such systems do achieve a limited amount or an approximation of braking proportionality, in some cases by actually tapping into the otherwise-closed hydraulic system of the towing vehicle and using the varying hydraulic pressure as a proportional signal or force, and sometimes by monitoring towing vehicle brake pedal movement. These systems usually require some form of additional hydraulic cylinder to be installed on the towed vehicle braking system (i.e., a slave cylinder coupled to the master cylinder of the towed vehicle), and this not only requires the use of expensive additional parts but also requires a licensed mechanic to do the installation. In addition to these disadvantages, these approaches inevitably create a risk of brake failure on either or both the towing vehicle and towed vehicle.

A different and non-intrusive towed vehicle braking system is a modification of the well-known "surge systems", in which the hitch mechanism between the towed vehicle and the towing vehicles allows for a limited range of relative motion between the two vehicles in response to speed changes that occur during braking, i.e. they allow the towed vehicle to move forward relative to the towing vehicle when the brakes of the latter are actuated, and this change in relative position is coupled mechanically or hydraulically to the foot pedal or master cylinder actuation linkage of the towed vehicle, such that the brake pedal and/or master cylinder piston of the towed vehicle is moved so as to apply the brakes on the towed vehicle. While there are a number of significant limitations and/or disadvantages in the use of such systems, they do at least provide a form of proportional braking for the towed vehicle based on the braking of the towing vehicle.

Other proposed braking systems for this purpose utilize large and cumbersome mechanisms that are bolted onto the floor of the towed vehicle, or wherever else space permits, whenever it is to be towed, to operate the brake pedal by means of levers, solenoid plungers, or power cylinders attached to the brake pedal; however, these systems do not actually achieve true proportioning operation of the towed vehicle brakes since the length of actuator travel does not in fact equate to proportional braking force. On the contrary, such proportionality must come from the difference in pressure introduced into the braking system of the towed vehicle as a result of force exerted on the brake pedal or master cylinder piston.

BRIEF SUMMARY OF INVENTION

In one aspect, the present invention provides a simple but highly effective system and apparatus for achieving proportional braking of a towed vehicle based on the braking operation of the towing vehicle, and the invention achieves this desirable result without any intrusion into the hydraulic system of either vehicle, as well as with minimal and easy modification of the towed vehicle. Further, the invention achieves these desirable results by taking advantage of the power braking system in the towed vehicle without operating the vehicle engine, thereby providing truly effective braking in an economical and reliable manner.

In another aspect, the invention provides apparatus for controllably operating hydraulically actuated brakes on the towed vehicle in response to the motion of a towing vehicle, including a control unit having a sensor which provides an electrical output signal in response to deceleration of the towing vehicle, and the brake actuation assembly having an electrical input coupled to receive the electrical output signal from the control unit and having a mechanical output member which is controllably moved in accordance with the electrical output signal from the control unit, the hydraulically actuated brakes of the towed vehicle including a movable operating member onboard the towed vehicle for controllably operating its hydraulic brakes and the mechanical output member of the brake actuation assembly being connectable to the movable brake-operating member of the towed vehicle to operate its hydraulic brakes and slow the towed vehicle in response to sensed deceleration of the towing vehicle. In a particular example, the movable brake-operating member on board the towed vehicle would be a brake pedal normally operable by the driver of the vehicle, and in a preferred embodiment the mechanical output member of the brake actuation assembly comprises or includes a flexible cable which pulls on the brake pedal rather than pushing it.

In other aspects of the invention, in particular preferred embodiments, the brake actuation assembly includes a switchable or otherwise controllable clutch, in particular a slip clutch, preferably an electromagnetic clutch. In other particular or preferred aspects, the control unit may be implemented by use of conventionally available electrical trailer brake controllers, preferably but not necessarily of the type which include an inertia sensor and provide an output brake-actuation signal which is proportional to the sensed deceleration of the towing vehicle.

The foregoing principal aspects and features of the invention will become better understood upon review of the ensuing specification and the attached drawings, describing and illustrating preferred embodiments of the invention.

BRIEF DESCRIPTION OF THE DRAWINGS

FIG. 1A is an enlarged fragmentary side view of components located within the circle shown in FIG. 1 to which FIG. 1A is connected by the indicated projection line;

FIG. 1B is an enlarged fragmentary side view of components located within the circle shown in FIG. 1 to which FIG. 1B is connected by the indicated projection line.

With particular reference to the foregoing figures, FIG. 1 depicts a typical highway environment in which a towing vehicle 10, for example a motorhome, is coupled to a towed vehicle 12 by a coupling mechanism 14 of a known and conventional nature. A wiring harness 16, 116 interconnects the two vehicles 10, 12 through a connector 216 (usually located at or near coupler 14 and illustrated in FIG. 2), so that various signals and/or excitation voltages may be sent from one such vehicle to the other, most usually from the towing vehicle 10 to the towed vehicle 12. Wiring harness 16, 116 and connector 216 may be conventional in their basic nature, connector 216 providing a convenient means for coupling and uncoupling the two vehicles electrically.

Figure 1:
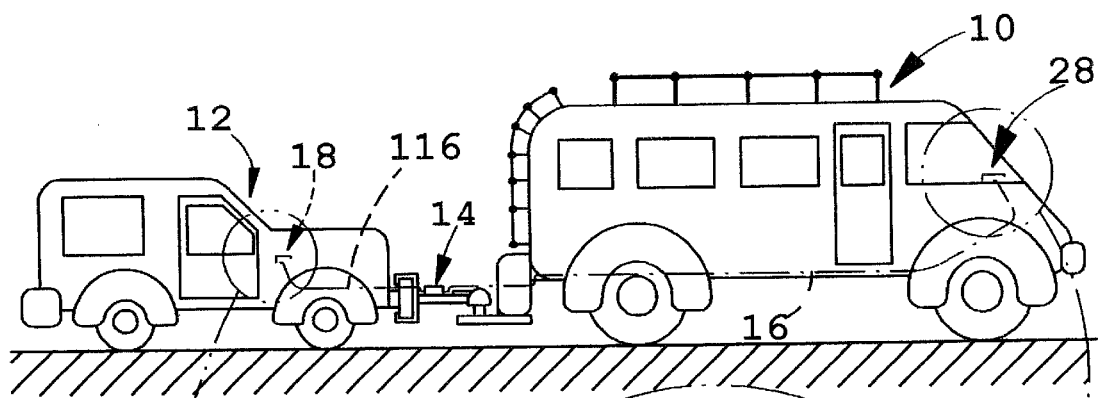
FIG. 1 is a pictorial/schematic view showing a typical environment for and use of the present invention.
Figure 1A:
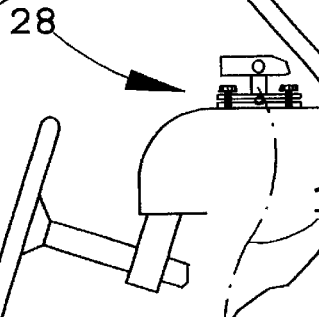

In accordance with the invention, the towed vehicle 12 includes a brake-actuating an brake-controlling unit 18 (indicated in FIG. 1 and shown in more detail in FIGS. 1B and 2), which will typically be mounted under the hood of the towed vehicle in some reasonably accessible area preferably on or close to its firewall 22. A coaxial tension cable assembly 20 ("Bowden-Cable" type) having a movable wire tension member 44 connected to and actuated by control unit 18 is entrained through the firewall 22 and coupled to the brake pedal 24 of towed vehicle 12 to impart a pulling force upon brake pedal and thereby apply the standard vehicle brakes on towed vehicle 12. Preferably wire tension member 44 is so connected by use of a short length of chain 45 or other such flexible but substantially inelastic material, and by use of a quickly and readily releasable clamp, device, or pin 25, each end thereof. In most instances, towed vehicle brake pedal 24 is conventionally suspended from its top by a pivot pin or bolt, about which it rotates when pushed downwardly by the foot of the operator. The same movement will result when pedal 24 is pulled by cable assembly 20. In view of this basic structural arrangement, it is therefore desirable to mount the actuating mechanism 18 and/or orient the axis of the cable 20 such that the latter is essentially disposed generally tangential to the arcuate path over which brake pedal 24 travels and/or generally perpendicular to the brake pedal.

In addition to the cable 20 and its actuating apparatus (described in more detail below), the overall system comprising apparatus 18 includes an auxiliary vacuum pump 26 (FIG. 2) which also preferably mounts under the hood of towed vehicle 12 at any convenient location and is utilized to maintain a desired amount of vacuum (i.e., partial pressure or negative pressure) at the towed vehicle master cylinder 212 (FIG. 2), to enable use of the power-assisted braking capabilities of the towed vehicle. While additional comments are set forth below pertaining to this aspect, it should be noted here that vacuum pump 26 may be any standard or conventional electrically actuated vacuum pump that operates on standard automotive battery voltages, and its vacuum port may simply be coupled by appropriate tubing 27 to the conventional accumulator portion of the towed vehicle master cylinder 212, as for example by connecting a T-fitting into the conventional automotive tubing or piping (not shown) by which master cylinder 212 normally receives its vacuum supply for conventional assisted braking.

An additional feature and preferred component of the present invention is the use of an electronic controller 28 (FIGS. 1 and 2) of the type conventionally known and used in conjunction with the control of electrically-actuated brakes used on trailers and the like, for example the type of controller shown in commonly-owned U.S. Pat. Nos. 5,050,927, 5,352,028, 5,333,948, or 5,149,176, (all of which are incorporated by reference herein) and/or various other such controllers known in the art. Basically, these controllers operate by applying electrical excitation from the towing vehicle battery/alternator supply to the electromagnetic brake actuators on trailer-type towed vehicle in response to some desired command and control criteria, often over some predetermined excitation profile which rises with time and has various other desired characteristics.

Most preferably, the apparatus of the present invention uses a controller 28 of the type having an inertia-sensing capability, which applies braking excitation to the towed vehicle brakes in a magnitude which corresponds to the amount of braking actually experienced at the towing vehicle, i.e., a controller which provides towed vehicle braking actuation that is generally proportional to the braking of the towing vehicle. This is a characteristic of the controllers disclosed in the first three patents identified above, which contemplate use of an inertia sensor of the type disclosed and claimed in commonly owned U.S. Pat. No. 5,058,960, which provides a continuing, proportional electrical output signal whose magnitude is determined by the inertial changes (i.e. braking deceleration) experienced at the towing vehicle. Identified U.S. Pat. No. 5,333,948 provides a different form of inertially responsive brake control voltage, i.e., one which is determined by preselected amounts of inertial change, and all such controllers do or may include electrical circuitry for shaping the onset of braking excitation so as to conform to some desired actuation profile, in which braking excitation is determined by and corresponds generally to tow vehicle deceleration but is not strictly and directly related thereto, and instead has certain portions of the curve emphasized while others are de-emphasized in order to provide a particular, designed overall braking response.

In accordance with the present invention, the inertially related output excitation provided by controller 28 that is conventionally used to actuate brake shoes into engagement with brake drums on trailers is instead used to actuate and operate a closed hydraulic braking system on the towed vehicle 12. This is preferably accomplished by the actuating means 18 referred to generally above and shown in more detail in FIGS. 1B and 2. In the embodiment illustrated therein, brake actuator 18 includes a gearmotor unit 30, preferably one which is operable by a 12-volt DC automotive supply (such as a Dayton permanent-magnet D.C. gearmotor), having a rotary output shaft 32 upon which a pair of electromagnetic brake actuators 34 are slidably rotatably mounted, each disposed on an opposite side of an axially aligned disc-like steel pulley or sheave 35 that is also concentrically mounted on shaft 32, all such shaft-mounted components being retained in closely adjacent position on shaft 32 by securable end collars 39. Preferably, gearmotor 30 and its assembled components 32–39 inclusive are mounted on a support pad 40, which in turn is mounted upon a base 42. While rotary output shaft 32 projects outwardly away from gearmotor 30 and is shown in FIGS. 1B and 2 as being cantilevered above base 42, it will be understood that the outboard end of this shaft, disposed away from gearmotor 30, may if desired be rotatably supported upon base 42 by any desired type of bearing and bearing-support block or the like (not shown).

The brake-actuating electromagnets 34 are freely rotatably disposed on shaft 32 through apertures at their center, but sheave 35 and end collars 38 are non-rotatably secured to shaft 32 by appropriate set screws or the like. The brake-actuating electromagnets 34 may in this embodiment be typical commercially available electric brake components, such as those known in the industry as "ten by two and a quarter Hayes-type magnets", as for example those sold by Tekonsha Engineering Company of Tekonsha, Mich., and identified as Tekonsha Part Number 5105 or 5108. The remainder of the components which comprise actuator 18 in the embodiment under discussion may be standard off-the-shelf items, selected and mounted to interfit and work together in the illustrated manner.

Figure 1B:
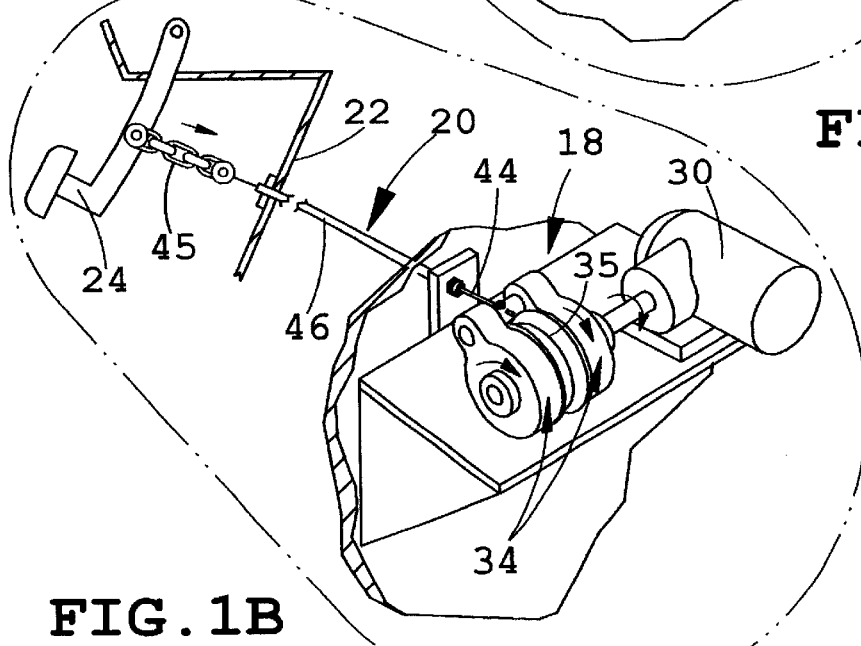
Figure 2:
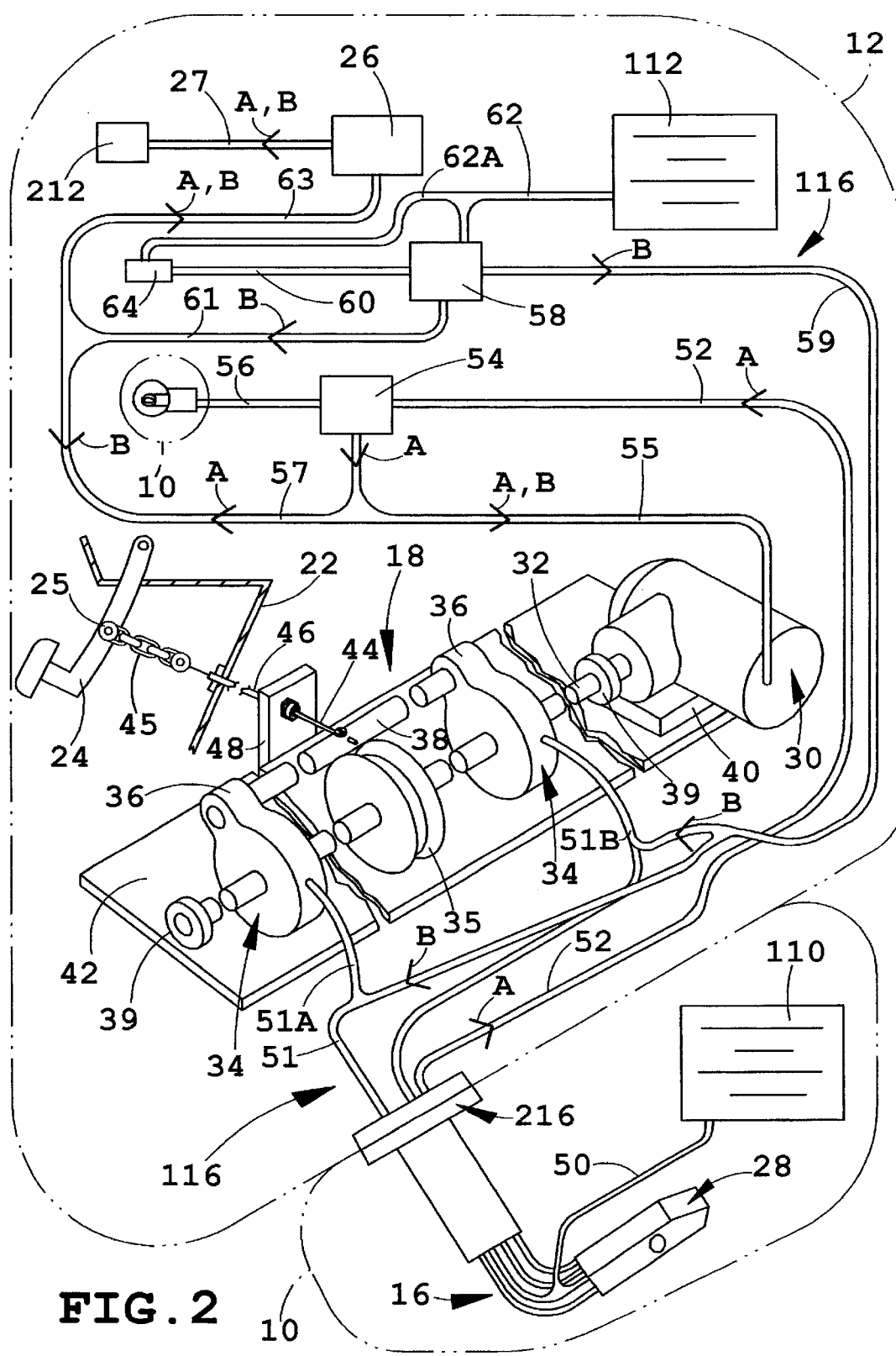
FIG. 2 is an enlarged pictorial/schematic block diagram, a portion of which is shown in fragmentary perspective, schematically illustrating the overall system of the invention by way of its interconnected components and electrical current flow paths.

As illustrated in FIGS. 1B and 2, the electromagnetic brake actuators 34 have an outer housing which is generally circular and disc-like in shape in its central area but which also has a laterally projecting, rounded knuckle portion 36 with a transverse aperture through which a rigid coupling bar 38 extends, in the preferred embodiment illustrated, such bar being secured in place in any desired manner. Conventionally, the brake actuators 34 are used as a means for operably moving a brake shoe actuation arm or member, typically in the nature of a lever, and one such actuator unit is employed at each wheel equipped with brake shoes, to supply the force which urges the shoes into braking engagement with a corresponding brake drum, all in a known manner. In such conventional configurations, the actuator units 34 are rotatably disposed on a spindle, post, or other such shaft, and located adjacent the brake drum, with their knuckle portions 36 connected to the brake shoe actuator levers. In such an arrangement, when the actuators 34 receive direct current operating excitation they produce a strong magnetic field that pulls them flush against (or very close to) to the side of the adjacent brake drum, which is rotating as the vehicle moves. This torques the actuator and it in turn applies force to the attached brake shoe actuation lever, forcing the brake shoe against the annular lip of the drum.

In accordance with the present invention, the knuckles 36 are utilized to hold coupling bar 38 in position, and the latter has the slidable inner wire or other such operating element 44 of sheathed cable assembly 20 fixed to it, as by a set screw. The outer sheath portion 46 of cable 20 is then secured to an upright mounting plate 48 that is attached to base 42. The opposite end of cable wire 44 is releasably secured to the towed vehicle brake pedal 24, as described above, preferably by use of a short length of chain or the like. Consequently, as will be apparent, excitation of the electromagnet produces a magnetic field which pulls actuators 34 toward (and typically into flush sliding against) the sides of the rotating steel sheave 35. This torques the actuators 34 about gearmotor output shaft 32 and imparts corresponding leveraged motion to the connecting bar 38. As this motion occurs in a direction away from support 48, the resulting tension force applied to and resulting movement of cable wire 44 and chain 45, pulls brake pedal 24 downwardly, applying the brakes on the towed vehicle 12.

The basic operation of actuator 18 will likely be apparent from the preceding remarks and the attached drawings. Thus, brake controller 28 receives operating power from the towing vehicle battery 110 on conductor 50 (FIG. 2) and responds to desired criteria such as tow vehicle inertial changes, i.e., deceleration, or to manual commands, etc., by outputting a controlled variable voltage on the electrical conductors of wiring harness 16, 116 which provide flow paths 51, 51A, using the tow vehicle battery 110 as a source. This is directly analogous to the operation of controller 28 when used to control electrically-actuated trailer brakes. As is well known, the electromagnet/actuators 34 include a plurality of electrical windings inside an outer housing, and these windings produce a strong laterally-directed unidirectional magnetic field in response to the d.c. excitation received from controller 28. When assembled for operation in accordance with the present invention, electromagnet/ actuators 34 are located closely adjacent the sides of steel sheave 35, with collars 39 holding these components in place. Under these conditions, if gearmotor 30 is rotating shaft 32 while magnet/actuators 34 are energized, the electromagnet/actuators 34 will be strongly attracted to the sides of sheave 35, which is secured to shaft 32 and thus rotates with it. This magnetic attraction to the rotating steel sheave 35 exerts a strong rotational force (torque) on electromagnet/actuators 34, and this force urges the outwardly projecting arms or knuckles 36 in a rotational direction about gearmotor shaft 32, thereby moving the connecting shaft or bar 38 in a corresponding manner and pulling strongly on actuating cable 44.

An important aspect of this operation is the fact that gearmotor 30 should have sufficient torque to avoid stalling when the electromagnetic actuators 34 are energized, i.e., gearmotor output shaft 32 and sheave 35 should continue to rotate even though the electromagnet/actuators 34 are fully energized and maximally attracted to the sides of sheave 35, to thereby exert maximum pulling force on cable wire 44. The operation of electromagnet/actuators 34 and sheave 35 thus provide an electrically-actuated torque-transmitting slip clutch or coupling between gearmotor 30 and cable 44, sometimes referred to herein as a "compliant coupling", and the gearmotor should not stall even when maximum braking forces are being applied to brake pedal 24 through cable 44.

As will be appreciated, stalling of gearmotor 30 is to be avoided because it would cause very large and potentially damaging amounts of electrical current to be drawn by the gearmotor 30, which might seriously damage the latter and also adversely affect the performance of the electrical system and related components on the towing vehicle 10 (as well as severely limiting or eliminating the power available for braking the towed vehicle 12).

As stated above, the brake controller 28 receives operating power from the battery power supply 110 of the towing vehicle 10, e.g. on an input conductor 50 (FIG. 2), and the controller 28 will in effect modulate the amount of power from the tow vehicle battery power supply 110 applied through conductor providing flow paths 16 and 51A, 51B to the electromagnet/actuators 34, to modulate and control the resulting magnetic attraction force between the actuators 34 and steel sheave 35 and provide a braking force which is proportional to and based upon the amount of braking demanded by operation of tow vehicle 10. In this operation, the electromagnetic actuators 34 and sheave 35 in effect provide a compliant brake-actuation coupling which controls the amount of pulling force applied to the cable 44 and, through it, to the brake pedal 24. Since in the preferred embodiment controller 28 is of the type which includes an inertia sensor, the amount of braking applied to the towed vehicle is proportional to the deceleration of the towing vehicle as a result of its own brakes being applied; however, various other types of controller function or operation may also be utilized, including simple manual commands by the tow vehicle operator.

Gearmotor 30 normally receives operating power from the tow vehicle battery 110, through conductor providing flow paths 50, 52, and 55, controlled by a relay or other switching element 54 (which may comprise semiconductor switches) whose actuation is controlled by and responsive to excitation of the tow vehicle brake light circuit, represented by conductor/flow path 56. Consequently, the operating power for gearmotor 30 is switched on and off by switch 54 in response to actuation of the tow vehicle brakes and resulting energization of brake light conductor 56, such that gearmotor 30 will be switched on each time the brakes on tow vehicle 10 are actuated. As a result, the rotary output shaft 32 of gearmotor 30 will immediately commence rotating whenever the tow vehicle brakes are actuated. The extent to which this causes braking of the towed vehicle 12 in the manner discussed above is determined by the operation of control 28, which (as noted above) is preferably of the type which includes and is controlled by an inertia sensor. Thus, the harder the towing vehicle brakes are applied, the more braking force will be applied to the brake pedal 24 of towed vehicle 12, and by it to the towed vehicle master cylinder and braking system.

Since it is desirable to utilize the power brake feature of the towed vehicle 10, to thereby achieve greater braking forces through less pedal force, but not desirable to have the engine of towed vehicle 12 running at all times it is being towed, vacuum pump 26 is controlled so as to be put into operation whenever the towed vehicle brakes are likely to be actuated, but not otherwise. This may readily be accomplished by the same relay or switch 54 that controls operation of gearmotor 30 (or by a separate relay or switch), such that vacuum pump 26 is also energized by the tow vehicle battery 110 through flow path/conductor 52, and then along flow paths 57 and 63 (under current flow direction "A"). Thus, each time gearmotor 30 commences operation, vacuum pump 26 also operates. As previously indicated, the output of pump 26 is coupled by tubing or piping 27 to the towed vehicle master cylinder vacuum assist unit 212, so as to replenish vacuum which has been depleted through actuation of the towed vehicle brakes. Since the amount of vacuum applied to the towed vehicle master cylinder assist unit 212 should be regulated at predetermined levels, a pressure regulator (not separately shown) should be interposed between vacuum tubing 27 and the vacuum assist unit 212 for the towed vehicle 12, or else included in that unit. Such a regulator may either be an additional unit supplied with vacuum pump 26 to control its output, or may be provided by the towed vehicle's built-in pressure regulator which controls the towed vehicle braking assist "power brake" unit itself.

A further aspect of the present invention is a means by which the brakes on the towed vehicle 12 will automatically be actuated in the event that the towed vehicle 12 breaks away from the towing vehicle 10 during towing operations. While to some extent optional, such a system is obviously very desirable, and may be mandated by law in various jurisdictions. In order to implement such a feature in the present invention, a conventional breakaway switch 64 (FIG. 2), typically associated with or located near the coupler mechanism 14 and connector 216, may be utilized to energize a second relay or other such switch component 58, through an input (switching) conductor/path 60 that is connected to breakaway switch 64 at or near the coupler 14. The power input to relay 58 is applied through a conductor or path 62, which is connected to the towed vehicle battery power supply 112, with the arrangement being that relay/switch 58 will normally be open and thus will not normally apply towed vehicle power from conductor 62 to the brake actuator 18 unit or vacuum pump 26.

Upon breakaway, switching input conductor 60 will receive excitation from the break-away switch 64 (supplied to switch 64 by the towed vehicle battery 112 on conductor 62A), thereby actuating relay/switch 58 to a closed position and applying towed vehicle battery power to both vacuum pump 26 (via conductors 61 and 63) and gearmotor 30 (via paths 61, 57 and 55) (conducting condition/current flow direction "B"). At the same time, towed vehicle battery power is also applied to the brake electromagnet/actuators 34, through a secondary path 59 (condition "B"), also controlled by relay/switch 58. Consequently, upon actuation of the breakaway switch 64, the full power of the towed vehicle battery power supply 112 will be applied directly to both of the brake electromagnet/actuators 34, even though coupler 14 becomes disconnected under such conditions due to the breakaway condition and cannot apply braking power from the towing vehicle via path 51. This maximum battery power excitation to electromagnet/actuators 34 with vacuum pump 26 and gearmotor 30 both energized and operating will of course cause full braking power to be applied to the towed vehicle 12, and as a result the towed vehicle 12 will be stopped in the shortest possible distance upon breakaway even though its engine is not running and it has no human operator.

As will be understood, the foregoing disclosure and attached drawings are directed to a single preferred embodiment of the invention for purposes of illustration; however, it should be understood that variations and modifications of this particular embodiment may well occur to those skilled in the art after considering this disclosure, and that all such variations etc., should be considered an integral part of the underlying invention, especially in regard to particular shapes, configurations, component choices and variations in structural and system features. In this regard, it is to be noted that actuator unit 18 may utilize other componentry and/or be otherwise configured to accomplish essentially the same purpose; e.g., the compliant coupling or clutch provided by electromagnet/actuators 34 and sheave 35 may be implemented through the use of other such electrically actuated slip-clutches or analogous force-transmittal components, and the controlling means represented by circuit 116 and its switching components may also be otherwise configured or implemented.

Furthermore, the braking command and force produced by the actuator unit 18 (bar 38, with or without use of a cable/wire set 44, 46, or chain/flex member 45) may be applied to a master cylinder actuation piston through use of an appropriate mechanical connection and linkage (preferably of a readily disengageable type) to directly apply the hydraulic brakes of a towed vehicle through use of that vehicle's own onboard hydraulic system. Relative to chain/flex link 45, it will be appreciated that use of such a member enables normal foot-actuated brake pedal operation by a driver without disconnecting the tension assembly/unit 44, since the chain/flex link 45 will under these conditions simply relax and droop, without exerting a pushing force upon wire 46. Of course, when wire 46 is actuated to pull down on brake pedal 24, chain/flex link transfers the corresponding force directly to the brake pedal without any lost motion.

The above description is considered that of the preferred embodiments only. Modifications and variations of this and other such embodiments may well occur to those skilled in the art and to those who make or use the invention after learning of it through access to such preferred embodiments. Accordingly, it is to be understood that the embodiments shown in the drawings and described above are merely for illustrative purposes and should not be used to limit the scope of the invention, which is defined by the following claims as interpreted according to the principles of patent law, including the doctrine of equivalents.

The invention claimed is:

1. Apparatus for controllably operating hydraulically actuated brakes on a towed vehicle in response to the motion of a towing vehicle, comprising in combination:
   a control unit including a sensor providing a varying electrical output signal in response to braking of the towing vehicle;
   a brake actuation assembly having an electrical input coupled to receive said electrical output signal from said control unit and having a mechanical output member which is controllably moved in accordance with said electrical output signal, said brake actuation assembly including an electrically actuated variably responsive clutch for transmitting a varying actuation force to said mechanical output member;
   said hydraulically actuated brakes including a movable operating member onboard said towed vehicle for controllably operating the towed vehicle brakes to cause braking of the towed vehicle, and said mechanical output member of said brake actuation assembly being connectable to said movable operating member to move it and thereby operate said hydraulic brakes to brake said towed vehicle in varying amounts in response to braking of said towing vehicle.

2. The apparatus of claim 1, wherein said compliant coupling comprises a magnetically operated slip clutch.

3. The apparatus of claim 2, wherein said slip clutch includes at least one electromagnet and at least one member of magnetic material which is movably mounted relative to said at least one electromagnet and in close proximity thereto so as to be within a magnetic field produced by said at least one electromagnet.

4. The apparatus of claim 3, wherein said at least one member of magnetic material is mounted for rotation about an axis and said at least one electromagnet is also movably mounted.

5. The apparatus of claim 4, wherein said brake actuation assembly includes a motor having a rotatable output shaft and said at least one member of magnetic material is mounted on said shaft to be rotated thereby.

6. The apparatus of claim 5, wherein said at least one electromagnet is also mounted on said shaft.

7. The apparatus of claim 6, further including switchable motor drive apparatus coupled to said motor to initiate rotation thereof in response to braking of said towing vehicle.

8. Apparatus for controllably operating hydraulically actuated brakes on a towed vehicle in response to the motion of a towing vehicle, comprising in combination:
   a control unit including a sensor providing an electrical output signal in response to deceleration of the towing vehicle;
   a brake actuation assembly having an electrical input coupled to receive said electrical output signal from said control unit and having a mechanical output member which is controllably moved in accordance with said electrical output signal, said brake actuation assembly including a switchably actuateable clutch for transmitting actuation force to said mechanical operating member in response to said control unit electrical output signal;
   said hydraulically actuated brakes including a movable operating member onboard said towed vehicle for controllably operating the towed vehicle brakes to cause braking of the towed vehicle, and said mechanical output member of said brake actuation assembly being connectable to said movable operating member to move it and thereby operate said hydraulic brakes to brake said towed vehicle in response to deceleration of said towed vehicle.

9. The apparatus of claim 8, wherein said brake actuation assembly further includes apparatus to controllably enable a power brake system on said towed vehicle, for power-assisted braking thereof on concert with operation of said mechanical output member.

10. The apparatus of claim 9, wherein said control unit sensor comprises an inertia sensor and said electrical output signal provided thereby has a varying magnitude which is generally proportional to inertia changes relating to deceleration of said towing vehicle.

11. The apparatus of claim 10, wherein said control unit comprises an inertially responsive electric trailer brake control device.

12. The apparatus of claim 11, wherein said apparatus to controllably enable a power brake system includes a controllably actuatable pump adapted to be coupled to said power brake system on said towed vehicle.

13. The apparatus of claim 12, wherein said controllably actuateable pump is switchably coupled to said towing vehicle to operate said pump in response to braking of said towing vehicle.

14. The apparatus of claim 13, wherein said clutch is switchably coupled to said control unit to operate under control of said unit.

15. The apparatus of claim 14, wherein said pump is switchably coupled to said control unit to operate under control of said unit.

16. Apparatus for controllably operating hydraulically actuated brakes on a towed vehicle from a towing vehicle, comprising in combination:

a control unit to be carried on the towing vehicle for providing an electrical output signal;

a brake actuation assembly mountable on said towed vehicle and having an electrical input coupled to receive said electrical output signal from said control unit, said assembly having a mechanical output member which is controllably movable in response to said electrical output signal;

said hydraulically actuated brakes including a movable operating member onboard said towed vehicle for controllably operating the towed vehicle brakes to cause braking of the towed vehicle, said mechanical output member of said brake actuation assembly being connectable to said movable operating member to move it and thereby operate said hydraulic brakes to brake said towed vehicle in response to the output signal from said control unit on said towing vehicle; and an electrically actuated variably responsive clutch for transmitting a varying actuation force to said mechanical output member.

17. The apparatus of claim 16, wherein said compliant coupling comprises a switchably actuateable slip clutch.

18. The apparatus of claim 17, wherein said switchably actuatable clutch is coupled to said control unit for actuation thereby.

19. The apparatus of claim 17, wherein said clutch includes at least one electromagnet and at least one member of magnetic material which is movably mounted relative to said at least one electromagnet and in close proximity thereto so as to be within a magnetic field produced by said at least one electromagnet.

20. The apparatus of claim 19, wherein said brake actuation assembly includes a motor having a rotatable output shaft and said at least one member of magnetic material mounted on said shaft to be rotated thereby.

21. The apparatus of claim 20, wherein said at least one electromagnet is also mounted on said shaft.

22. The apparatus of claim 19, further including switchable motor drive apparatus coupled to said motor to initiate rotation thereof in response to signals from said control unit.

23. The apparatus of claim 16, wherein said brake actuation assembly further includes apparatus to controllably enable a power brake system on said towed vehicle, for power-assisted braking thereof in concert with operation of said mechanical output member.

24. The apparatus of claim 23, wherein said apparatus to controllably enable a power brake system includes a controllably actuatable pump adapted to be coupled to said power brake system on said towed vehicle and operative to maintain a predetermined pressurized of said system.

25. The apparatus of claim 23, wherein said apparatus to controllably enable a power brake system is coupled to said control unit for actuation thereby.

26. The apparatus of claim 17, wherein said switchably actuatable clutch is coupled to said control unit for actuation thereby.

* * * * *